(12) United States Patent
Conquest et al.

(10) Patent No.: US 11,585,939 B2
(45) Date of Patent: Feb. 21, 2023

(54) BASE STATION TRANSMISSION OF GNSS CORRECTION DATA VIA BEACON FRAME

(71) Applicant: Trimble Inc., Sunnyvale, CA (US)

(72) Inventors: Curt A. Conquest, Longmont, CO (US); David Bird, Westminster, CO (US)

(73) Assignee: Trimble Inc., Sunnyvale, CA (US)

( * ) Notice: Subject to any disclaimer, the term of this patent is extended or adjusted under 35 U.S.C. 154(b) by 281 days.

(21) Appl. No.: 16/550,826

(22) Filed: Aug. 26, 2019

(65) Prior Publication Data

US 2021/0063580 A1    Mar. 4, 2021

(51) Int. Cl.
*G01S 19/04*    (2010.01)
*G01S 19/44*    (2010.01)

(52) U.S. Cl.
CPC .............. *G01S 19/04* (2013.01); *G01S 19/44* (2013.01)

(58) Field of Classification Search
CPC .................................. G01S 19/04; G01S 19/44
USPC .... 342/357.44, 357.51, 357.27, 357.29, 464, 342/451
See application file for complete search history.

(56) References Cited

U.S. PATENT DOCUMENTS

| | | | | |
|---|---|---|---|---|
| 2010/0309051 | A1* | 12/2010 | Moshfeghi | G01S 5/0236 342/451 |
| 2011/0291882 | A1* | 12/2011 | Walsh | G01S 5/0289 342/464 |
| 2015/0260848 | A1* | 9/2015 | Mundt | G01S 19/074 342/357.44 |
| 2015/0338520 | A1* | 11/2015 | Boriskin | G01S 19/09 342/357.51 |
| 2017/0299731 | A1* | 10/2017 | Lie | G01S 19/43 |

OTHER PUBLICATIONS

International Search Report and Written Opinion for Application No. PCT/US2020/047997, dated Nov. 12, 2020, 16 pages.
International Preliminary Report on Patentability for Application No. PCT/US2020/047997, dated Mar. 10, 2022, 10 pages.

* cited by examiner

*Primary Examiner* — Bo Fan
(74) *Attorney, Agent, or Firm* — Kilpatrick Townsend & Stockton

(57) ABSTRACT

Techniques for transmitting global navigation satellite system (GNSS) correction data to a rover. GNSS signals are wirelessly received by a base station from one or more GNSS satellites. GNSS correction data is generated by the base station based on the GNSS signals. A beacon frame is formed by the base station to include a frame header, a frame body, and a frame check sequence (FCS). The frame body is formed to include the GNSS correction data. The beacon frame is wirelessly transmitted by the base station for receipt by the rover. The rover wirelessly receives the beacon frame. The GNSS correction data is extracted by the rover from the beacon frame. A geospatial position of the rover is calculated based on the GNSS correction data.

20 Claims, 12 Drawing Sheets

BASE STATION TRANSMISSION OF GNSS CORRECTION DATA VIA BEACON FRAME

BACKGROUND

Global navigation satellite systems (GNSS) use wireless signals that are transmitted from medium Earth orbit (MEO) satellites to GNSS receivers to determine position and velocity information for the GNSS receivers. Examples of currently operational GNSSs include the United States' Global Positioning System (GPS), the Russian Global Navigation Satellite System (GLONASS), the Chinese BeiDou Satellite Navigation System, and the European Union's (EU) Galileo. Today, GNSS receivers are used in a wide range of applications, including navigation (e.g., for automobiles, planes, boats, persons, animals, freight, military precision-guided munitions, etc.), surveying, mapping, and time referencing.

The accuracy of GNSS receivers has improved drastically over the past few decades due to several technological improvements. One such improvement is the use of differential measurement techniques, in which GPS signals received by a fixed receiver are used to generate correction data that is communicated to a mobile receiver. Typically, a roving receiver (or simply "rover") receives the correction data from a reference source or base station that already knows its exact location, in addition to receiving signals from GNSS satellites. To generate the correction data, the base station first tracks all the satellites in view and measures their pseudoranges. Next, the base station computes its position and compares the computed position to its known position to generate a list of corrections needed to make the measured pseudorange values accurate for all visible satellites. Last the correction data is communicated to the rover. The rover applies these corrections to its computed pseudoranges to produce a much more accurate position.

Another improvement to GNSS accuracy came through the use of real-time kinematic (RTK) measurement techniques, in which the rover determines its position relative to the base station by measuring the phase of the carrier wave. The carrier signal has a much shorter wavelength than the width of a PRN code (a hundred to a thousand times shorter), therefore allowing the ability to measure distance to improve proportionally. RTK networks offer several advantages to users, including (1) fast, centimeter-level positioning anywhere over a large area, (2) a common coordinate reference frame, and (3) elimination of the need to set up a private base station for a project.

SUMMARY

A summary of the invention is provided below in reference to a series of examples. As used below, any reference to a series of examples is to be understood as a reference to each of those examples disjunctively (e.g., "Examples 1-4" is to be understood as "Examples 1, 2, 3, or 4").

Example 1 is a method of transmitting global navigation satellite system (GNSS) correction data to a rover, the method comprising: wirelessly receiving, by a base station, GNSS signals from one or more GNSS satellites; generating, by the base station, the GNSS correction data based on the GNSS signals; forming, by the base station, a beacon frame comprising a frame header, a frame body, and a frame check sequence (FCS), wherein the frame body is formed to include the GNSS correction data; wirelessly transmitting, by the base station, the beacon frame for receipt by the rover; wirelessly receiving, by the rover, the beacon frame; extracting, by the rover, the GNSS correction data from the beacon frame; and calculating, by the rover, a geospatial position of the rover based on the GNSS correction data.

Example 2 is the method of example(s) 1, wherein the beacon frame is a Wi-Fi beacon frame.

Example 3 is the method of example(s) 1, wherein forming the beacon frame includes: calculating the FCS based on the frame header and the frame body; and appending the FCS to the frame header and the frame body.

Example 4 is the method of example(s) 1, wherein forming the beacon frame includes: forming an element comprising an element ID, a length, and information containing the GNSS correction data.

Example 5 is the method of example(s) 1, wherein the correction data includes a plurality of phases corresponding to the GNSS signals.

Example 6 is the method of example(s) 1, wherein the FCS includes a cyclic redundancy check (CRC) error-detecting code.

Example 7 is the method of example(s) 1, wherein the base station includes a GNSS antenna and a correction antenna, wherein the GNSS signals are received via the GNSS antenna and the beacon frame is transmitted via the correction antenna.

Example 8 is the method of example(s) 1, further comprising: at each of a plurality of times separated by a beacon interval: wirelessly receiving, by the base station, new GNSS signals from one or more new GNSS satellites; generating, by the base station, new GNSS correction data based on the new GNSS signals; forming, by the base station, a new beacon frame comprising a new frame body includes the new GNSS correction data; and wirelessly transmitting, by the base station, the new beacon frame for receipt by the rover.

Example 9 is a base station comprising: a global navigation satellite system (GNSS) antenna; a correction antenna; and one or more processors communicatively coupled to the GNSS antenna and the correction antenna, wherein the one or more processors are configured to perform operations comprising: wirelessly receiving, via the GNSS antenna, GNSS signals from one or more GNSS satellites; generating GNSS correction data based on the GNSS signals; forming a beacon frame comprising a frame header, a frame body, and a frame check sequence (FCS), wherein the frame body is formed to include the GNSS correction data; and wirelessly transmitting, via the correction antenna, the beacon frame for receipt by a rover, wherein the rover is operable to wirelessly receive the beacon frame and calculate a geospatial position of the rover based on the GNSS correction data.

Example 10 is the base station of example(s) 8, wherein the beacon frame is a Wi-Fi beacon frame.

Example 11 is the base station of example(s) 8, wherein forming the beacon frame includes: calculating the FCS based on the frame header and the frame body; and appending the FCS to the frame header and the frame body.

Example 12 is the base station of example(s) 8, wherein forming the beacon frame includes: forming an element comprising an element ID, a length, and information containing the GNSS correction data.

Example 13 is the base station of example(s) 8, wherein the correction data includes a plurality of phases corresponding to the GNSS signals.

Example 14 is the base station of example(s) 8, wherein the FCS includes a cyclic redundancy check (CRC) error-detecting code.

Example 15 is the base station of example(s) 8, wherein the operations further comprise: at each of a plurality of times separated by a beacon interval: wirelessly receiving, by the base station, new GNSS signals from one or more new GNSS satellites; generating, by the base station, new GNSS correction data based on the new GNSS signals; forming, by the base station, a new beacon frame comprising a new frame body includes the new GNSS correction data; and wirelessly transmitting, by the base station, the new beacon frame for receipt by the rover.

Example 16 is a non-transitory computer-readable medium comprising instructions that, when executed by one or more processors, cause the one or more processors to perform operations comprising: wirelessly receiving, by a base station, global navigation satellite system (GNSS) signals from one or more GNSS satellites; generating, by the base station, GNSS correction data based on the GNSS signals; forming, by the base station, a beacon frame comprising a frame header, a frame body, and a frame check sequence (FCS), wherein the frame body is formed to include the GNSS correction data; wirelessly transmitting, by the base station, the beacon frame for receipt by a rover, wherein the rover is operable to wirelessly receive the beacon frame and calculate a geospatial position of the rover based on the GNSS correction data.

Example 17 is the non-transitory computer-readable medium of example(s) 16, wherein the beacon frame is a Wi-Fi beacon frame.

Example 18 is the non-transitory computer-readable medium of example(s) 16, wherein forming the beacon frame includes: forming an element comprising an element ID, a length, and information containing the GNSS correction data.

Example 19 is the non-transitory computer-readable medium of example(s) 16, wherein the correction data includes a plurality of phases corresponding to the GNSS signals.

Example 20 is the non-transitory computer-readable medium of example(s) 16, further comprising: at each of a plurality of times separated by a beacon interval: wirelessly receiving, by the base station, new GNSS signals from one or more new GNSS satellites; generating, by the base station, new GNSS correction data based on the new GNSS signals; forming, by the base station, a new beacon frame comprising a new frame body includes the new GNSS correction data; and wirelessly transmitting, by the base station, the new beacon frame for receipt by the rover.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

Figure 1:
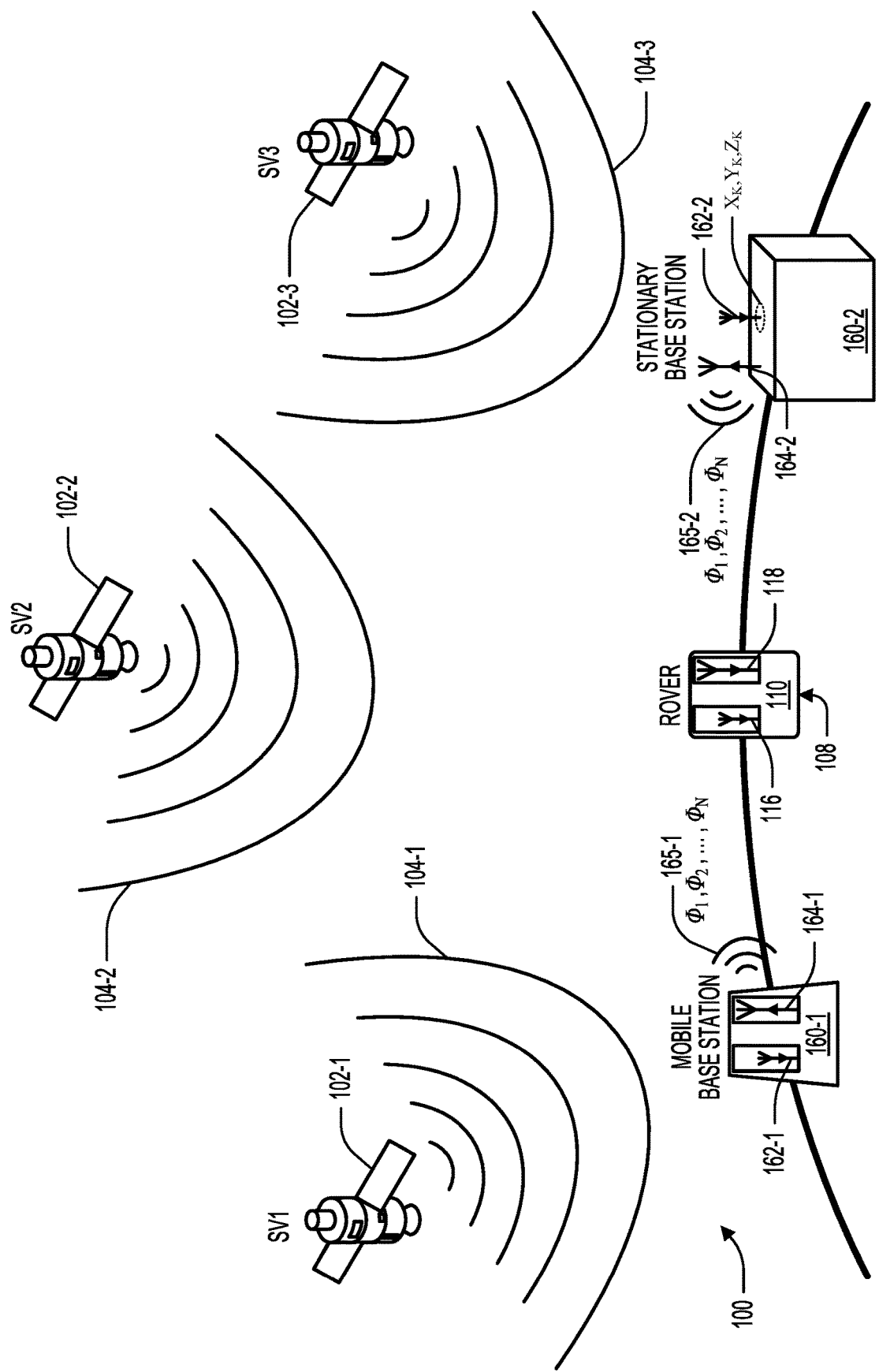
FIG. 1 illustrates an example of a rover, a mobile base station, and a stationary base station operating within a global navigation satellite systems (GNSS).

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION

Positioning systems that use real-time kinematic (RTK) measurement techniques rely on the measurement and communication of the phases of multiple carrier waves (or simply "carrier phases") by a base station. Upon receiving the carrier phases, a rover can compare them to its own set of carrier phases. To readily provide such carrier phases, both the rover and the base station may track the phases of the L1 and/or L2 carriers as well as the C/A code during the positioning process. While the C/A code cycle width, or epoch, of 1 ms can represent a distance of 300,000 m at the speed of light, the carrier wavelengths are much shorter distances: L1 is 0.19 m and L2 is 0.24 m. Accordingly, if the difference between reception times of the same carrier phase at two different receives can be measured to about 1% of a cycle, the relative positions can be resolved to within 0.001 m.

Various approaches allow communication of the carrier phases from the base station to the rover. In some instances, 450 MHz UHF radios may be used, which require frequency coordination as well as Federal Communications Commission (FCC) licenses for operation in certain areas. Accordingly, when deploying global navigation satellite systems (GNSS) base stations to new areas, a different license may be required. In some instances, 900 MHz transceivers may be used, such as those manufactured by FreeWave® or Trimble®. In some instances, cellular data modems may be used, which are limited to use in geographies with cellular system coverage and require paid service plans. In other instances, Internet Protocol (IP) may be used over Wi-Fi networks. However, this can require the rover to establish and maintain an association with a base station. An association requires two-way handshaking messages, and usually requires secure authentication. Also, a Wi-Fi rover can only associate with one base station at a time.

Embodiments of the present invention allow communication of RTK corrections from the base station to the rover using Wi-Fi beacon frames. In some instances, the correction data is inserted into the frame body of the beacon frame, which can be extracted upon reception by the rover. Typically in a wireless local-area network (WLAN) that is based on IEEE 802.11 standards (and marketed under the Wi-Fi name), an access point (AP) periodically transmits a beacon signal containing a beacon frame to announce the presence of the WLAN. The beacon frame includes information that allows devices to connect with the WLAN, such as an ID for the WLAN, capability information for the WLAN, supported rates for the WLAN, and various parameter sets.

The beacon frame is transmitted periodically at a beacon rate that is inversely proportional to a beacon interval, which is the time between successive transmissions. Once connected to the WLAN, a device may choose to ignore subsequently received beacon signals or to stop receiving the beacon signals altogether. In some instances, the devices connected to the WLAN may continue to receive the beacon signals so as to record the time stamp contained in the beacon frame and adjust their local clocks to become time synchronized with each other.

By inserting the correction data into the beacon frame, rover operators do not have to worry about frequency allocation, spectral coordination, or licenses, as the technology operates in the Industrial, Scientific and Medical (ISM) bands that allow operation without an end user licensing process, much like current Wi-Fi solutions. The correction data may arrive at the rover as a "connectionless delivery", which has significant advantages as the devices do not require a "connection" demanding greater sensitivity and signal strength. While correction data may be communicated via the beacon frame, the rover may still engage in an "authenticated" connection with the base station to transfer other data for site operations, such as video data, image data, and feedback for the base station. The feedback may request for a higher or lower beacon rate, a higher or lower beacon interval, a higher or lower signal strength, among other possibilities.

FIG. 1 illustrates an example of a rover 108 (containing a GNSS receiver 110), a mobile base station 160-1, and a stationary base station 160-2 operating within a GNSS 100, according to some embodiments of the present invention. GNSS 100 includes one or more GNSS satellites 102, i.e., space vehicles (SV), in orbit above rover 108 and base stations 160. GNSS satellites 102 may continuously, periodically, or intermittently broadcast wireless signals 104 containing PRN codes modulated onto carrier frequencies (e.g., L1 and/or L2 carrier frequencies). Wireless signals 104 corresponding to different GNSS satellites 102 may include different PRN codes that identify a particular GNSS satellite 102 such that receivers may associate different distance estimates (i.e., pseudoranges) to different GNSS satellites 102. For example, GNSS satellite 102-1 may broadcast wireless signals 104-1 which contain a different PRN code than the PRN code contained in wireless signals 104-2 broadcasted by GNSS satellite 102-2.

Similarly, GNSS satellite 102-3 may broadcast wireless signals 104-3 which contain a different PRN code than the PRN codes contained in wireless signals 104-1 and 104-2 broadcasted by GNSS satellites 102-1 and 102-2, respectively. One or more of wireless signals 104 may be received by a GNSS antenna 116 of GNSS receiver 110. GNSS antenna 116 may be a patch antenna, a turnstile antenna, a helical antenna, a parabolic antenna, a phased-array antenna, a resistive plane antenna, a choke ring antenna, a radome antenna, among other possibilities.

Each of GNSS satellites 102 may belong to one or more of a variety of system types, such as Global Positioning System (GPS), Satellite-based Augmentation System (SBAS), Galileo, Global Navigation Satellite System (GLONASS), and BeiDou, and may transmit wireless signals having one or more of a variety of signal types (e.g., GPS L1 C/A, GPS L2C, Galileo E1, Galileo ESA, etc.). For example, GNSS satellite 102-1 may be a GPS satellite and may transmit wireless signals having a GPS L1 C/A signal type (i.e., wireless signals having frequencies within the GPS L1 band and having been modulated using C/A code). GNSS satellite 102-1 may additionally or alternatively transmit wireless signals having a GPS L2C signal type (i.e., wireless signals having frequencies within the GPS L2 band and having been modulated using L2 civil codes). In some embodiments, GNSS satellite 102-1 may additionally be a Galileo satellite and may transmit wireless signals having a Galileo signal type (e.g., Galileo E1). Accordingly, a single satellite may include the ability to transmit wireless signals of a variety of signal types.

GNSS receiver 110 may use the distance estimates between itself and GNSS satellites 102-1, 102-2, and 102-3 to generate a position estimate through a process called trilateration. In some instances, trilateration involves generating multiple spheres having center locations corresponding to the locations of GNSS satellites 102 and radii corresponding to the distance estimates (i.e., pseudoranges). The intersection points of the spheres are used as the position estimate for GNSS receiver 110. The position estimate may be continuously, periodically, or intermittently updated by generating new distance estimates and performing trilateration using the new distance estimates. Subsequent position estimates may benefit from previous position estimates through filtering processes (e.g., Kalman filtering) capable of improving position estimate accuracy. Position estimates may also be determined using other techniques. In practice, a fourth satellite may be observed to estimate the receiver clock error with respect to the satellite system time.

Mobile base station 160-1 and stationary base station 160-2 may include GNSS antennas 162-1 and 162-2, respectively, where GNSS antenna 162-2 is positioned at a known position (e.g., $X_K, Y_K, Z_K$). Mobile base station 160-1 may be movable such that multiple mobile base stations 160-1 may be brought within or surrounding a project site so as to provide high-accuracy position estimates. Each of GNSS antennas 162 may be similar to GNSS antenna 116 and may be configured to receive one or more of wireless signals 104. For example, each of GNSS antennas 162 may be a patch antenna, a turnstile antenna, a helical antenna, a parabolic antenna, a phased-array antenna, a resistive plane antenna, a choke ring antenna, a radome antenna, among other possibilities.

Each of base stations 160 may send a correction signal 165 containing correction data to GNSS receiver 110. The correction data is used by GNSS receiver 110 to improve the accuracy of its position estimate. In some embodiments, the correction data includes a plurality of carrier phases $\Phi_1, \Phi_2, \ldots, \Phi_N$, where N is the number of GNSS satellites. In some embodiments, the correction data includes a 3D offset amount (e.g., $X_C, Y_C, Z_C$) for modifying the position estimate of GNSS receiver 110. In one example, position estimates of stationary base station 160-2 made using GNSS antenna 162-2 are compared to the known position and the correction data may be generated based on the comparison. In some embodiments, the correction data includes any one of various types of raw or processed satellite data.

Correction signals 165 containing the correction data may be wirelessly transmitted by base stations 160 using correction antennas 164 and may be received by GNSS receiver 110 using a correction antenna 118. The correction signals 165 may be transmitted continuously, periodically, or intermittently by base stations 160. In some embodiments, correction signals 165 are transmitted over a set of wireless frequencies outside the GNSS frequencies (e.g., lower than the GNSS frequencies). In some embodiments, correction antennas 164 may be used for transmission only and correction antenna 118 may be used for reception only, although in some embodiments additional handshaking between GNSS receiver 110 and base stations 160 may occur.

Figure 2:
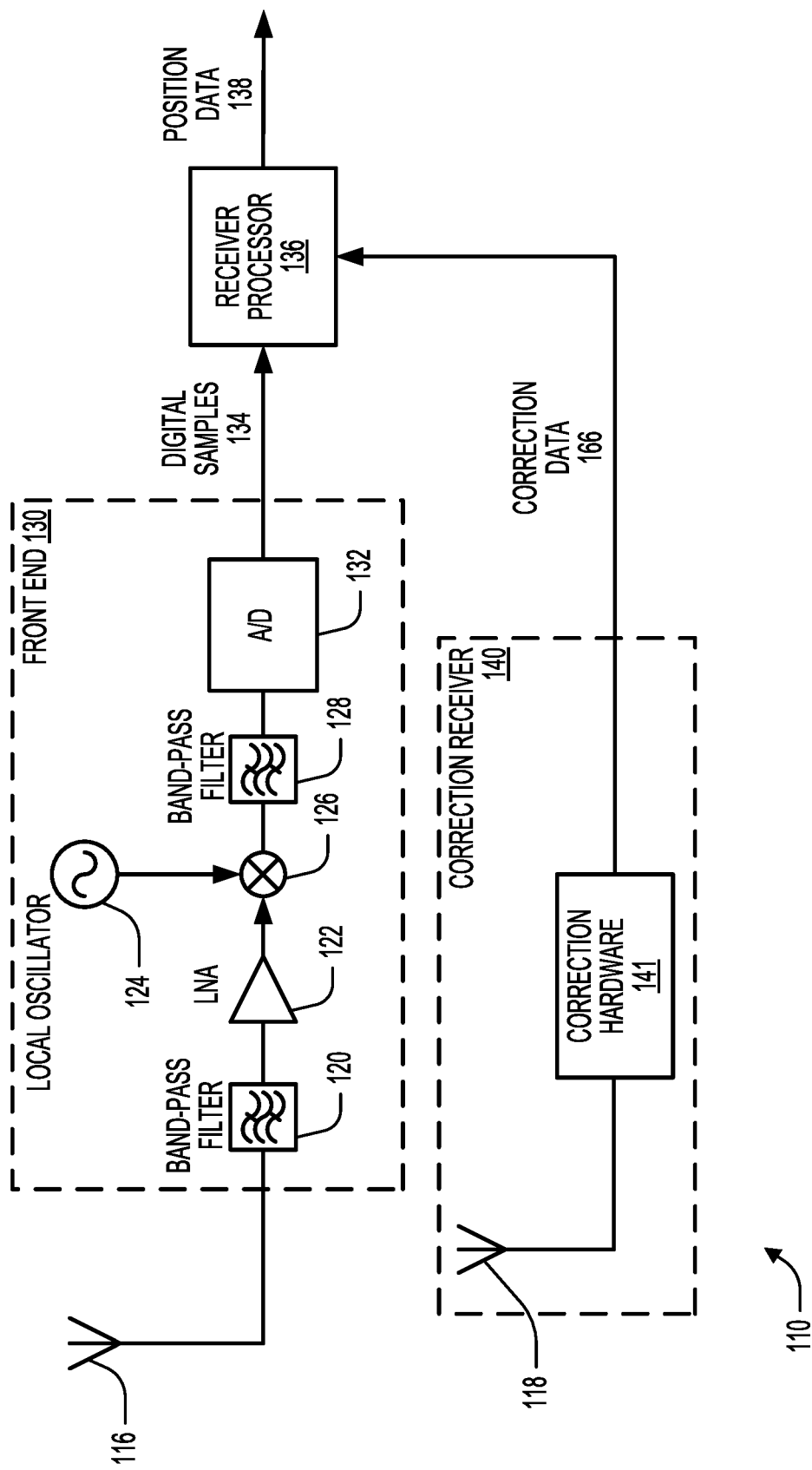
FIG. 2 illustrates a block diagram of a GNSS receiver.

FIG. 2 illustrates a block diagram of GNSS receiver 110, according to some embodiments of the present invention. GNSS receiver 110 includes antenna 116 for receiving wireless signals 104 and sending/routing wireless signals 104 to an RF front end 130. RF front ends are well known in the art, and in some instances include a band-pass filter 120 for initially filtering out undesirable frequency components outside the frequencies of interest, a low-noise amplifier (LNA) 122 for amplifying the received signal, a local oscillator 124 and a mixer 126 for down converting the received signal from RF to intermediate frequencies (IF), a band-pass filter 128 for removing frequency components outside IF, and an analog-to-digital (A/D) converter 132 for sampling the received signal to generate digital samples 134.

In some instances, RF front end 130 includes additional or fewer components than that shown in FIG. 2. For example, RF front end 130 may include a second local oscillator (90 degrees out of phase with respect to the first), a second mixer, a second band-pass filter, and a second A/D converter for generating digital samples corresponding to the quadrature component of wireless signals 104. Digital samples corresponding to the in-phase component of wireless signals 104 and digital samples corresponding to the quadrature component of wireless signals 104 may both be sent to a correlator. In some embodiments, digital samples corresponding to both in-phase and quadrature components may be included in digital samples 134.

Other components within RF front end 130 may include a phase-locked loop (PLL) for synchronizing the phase of local oscillator 124 with the phase of the received signal, and a phase shifter for generating a second mixing signal using local oscillator 124 that is 90 degrees out of phase with local oscillator 124. In some embodiments, RF front end 130 does not include band-pass filter 120 and LNA 122. In some embodiments, A/D converter 132 is coupled directly to antenna 116 and samples the RF signal directly without down-conversion to IF. In some embodiments, RF front end 130 only includes band-pass filter 120 and A/D converter 132. Other possible configurations of RF front end 130 are possible.

Digital samples 134 generated by RF front end 130 are sent to a correlator and/or a receiver processor 136. A correlator may perform one or more correlations on digital samples 134 using local codes. In some embodiments, one or more operations performed by the correlator may alternatively be performed by receiver processor 136. In some embodiments, the correlator is a specific piece of hardware, such as an application-specific integrated circuit (ASIC) or a field-programmable gate array (FPGA). In some embodiments, operations performed by the correlator are performed entirely in software using digital signal processing (DSP) techniques.

Based on multiple distance estimates corresponding to multiple GNSS satellites 102, as well as correction data 166 generated by a correction receiver 140 having correction hardware 141, receiver processor 136 generates and outputs GNSS position data 138 comprising a plurality of GNSS points. Each of the plurality of GNSS points may be a 3D coordinate represented by three numbers. In some embodiments, the three numbers may correspond to latitude, longitude, and elevation/altitude. In other embodiments, the three numbers may correspond to X, Y, and Z positions. Position data 138 may be outputted to be displayed to a user, transmitted to a separate device (e.g., computer, smartphone, server, etc.) via a wired or wireless connection, or further processed, among other possibilities.

Figure 3A:
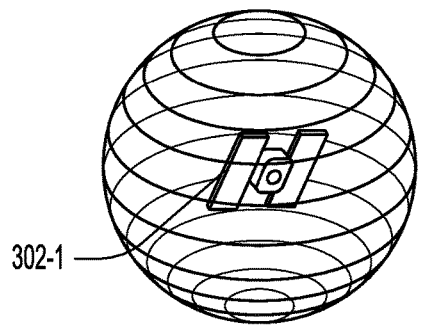
FIGS. 3A-3D illustrate a trilateration technique performed by a GNSS receiver to generate a position estimate.
Figure 3B:
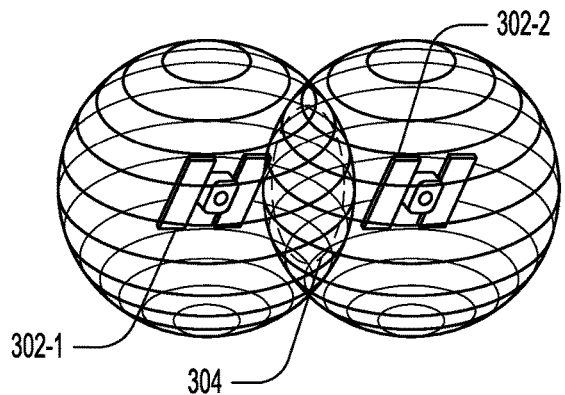

FIGS. 3A-3D illustrate a trilateration technique performed by GNSS receiver 110 (and similarly base stations 160) to generate a position estimate, according to some embodiments of the present invention. FIG. 3A shows a first scenario in which GNSS receiver 110 receives GNSS signals 104 from a first satellite 302-1 and generates a distance estimate (e.g., 20,200 km) for that satellite. This informs GNSS receiver 110 that it is located somewhere on the surface of a sphere with a radius of 20,200 km, centered on first satellite 302-1. FIG. 3B shows a second scenario in which GNSS receiver 110 receives GNSS signals 104 from a second satellite 302-2 and generates a distance estimate (e.g., 23,000 km) for the additional satellite. This informs GNSS receiver 110 that it is also located somewhere on the surface of a sphere with a radius of 23,000 km, centered on second satellite 302-2. This limits the possible locations to somewhere on the region 304 where the first sphere and second sphere intersect.

Figure 3C:
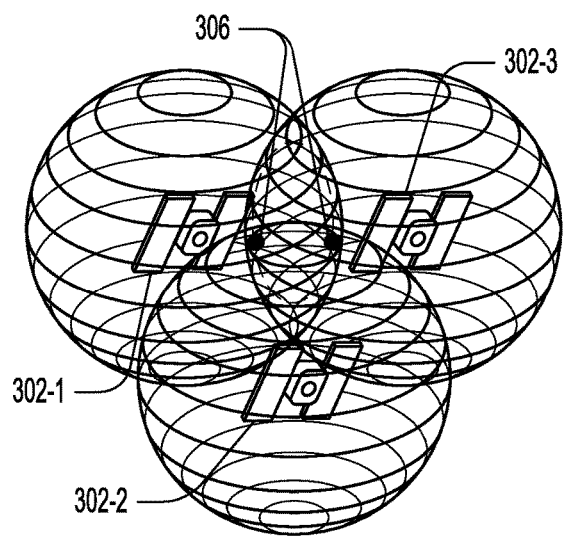
Figure 3D:
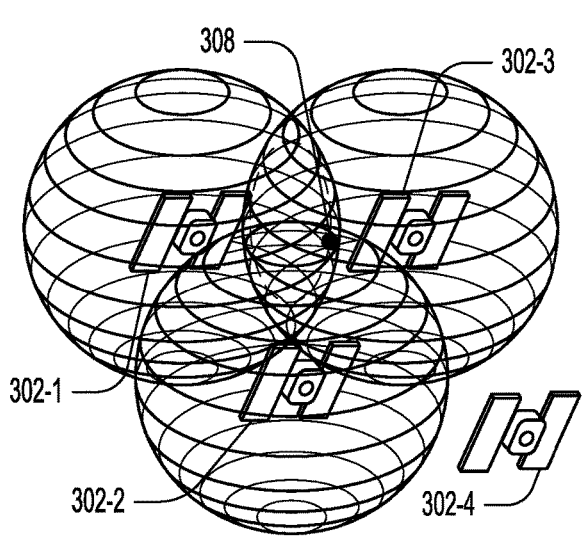

FIG. 3C shows a third scenario in which GNSS receiver 110 receives GNSS signals 104 from a third satellite 302-3 and generates a distance estimate (e.g., 25,800 km) for the additional satellite. This informs GNSS receiver 110 that it is also located somewhere on the surface of a sphere with a radius of 25,800 km, centered on third satellite 302-3. This limits the possible locations to two points 306 where first sphere 302-1, second sphere 302-2, and third sphere 302-3 intersect. FIG. 3D shows a fourth scenario in which GNSS receiver 110 receives GNSS signals 104 from a fourth satellite 302-4. Fourth satellite 302-4 can be used to resolve which of points 306 is a correct point 308 (by generating a fourth sphere) and/or to synchronize the receiver's clock with the satellites' time.

Figure 4:
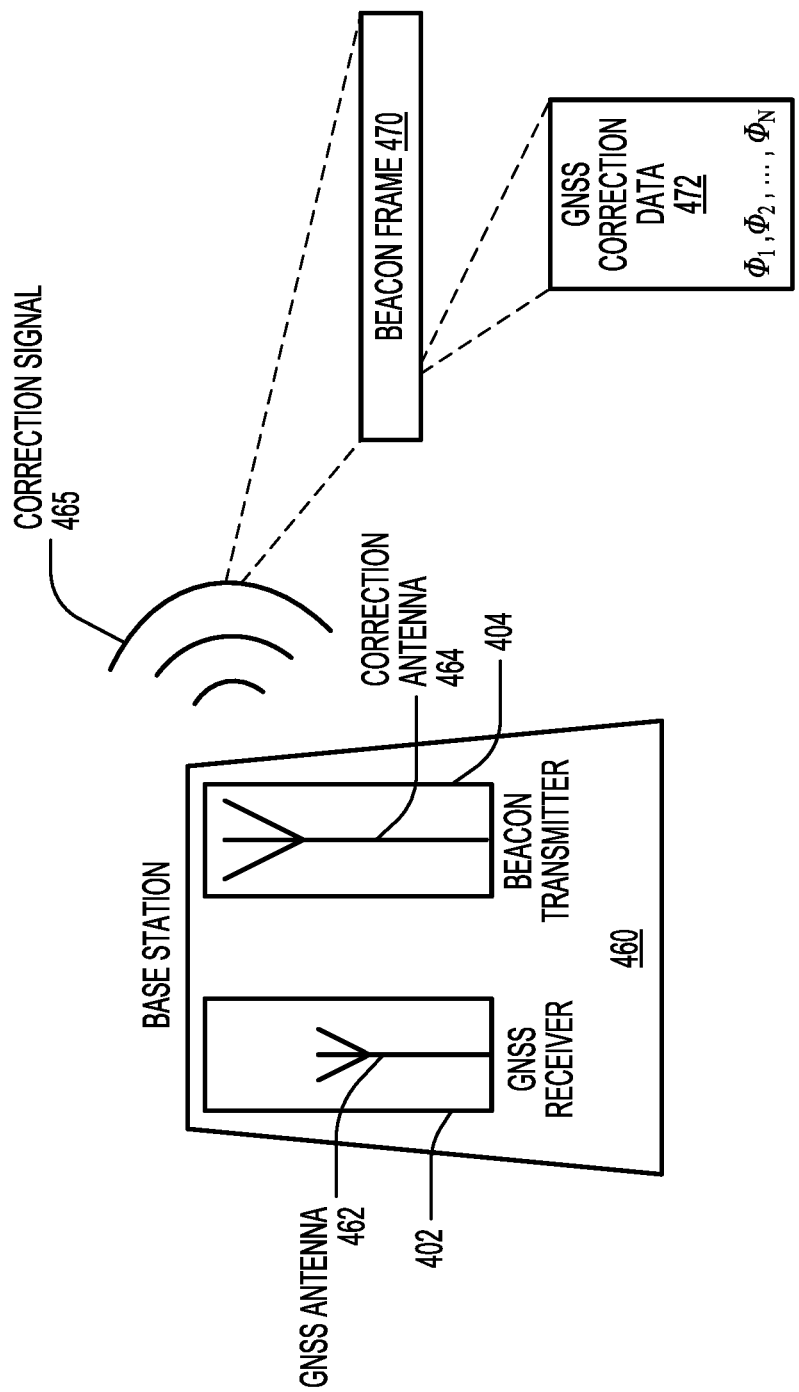
FIG. 4 illustrates an example block diagram of a base station.

FIG. 4 illustrates an example block diagram of a base station 460, according to some embodiments of the present invention. Base station 460 may include a GNSS receiver 402 having a GNSS antenna 462 and a beacon transmitter 404 having a correction antenna 464. Base station 460 may periodically transmit a correction signal 465 containing a beacon frame 470, which may include GNSS correction data 472, as described more fully herein.

Figure 5:
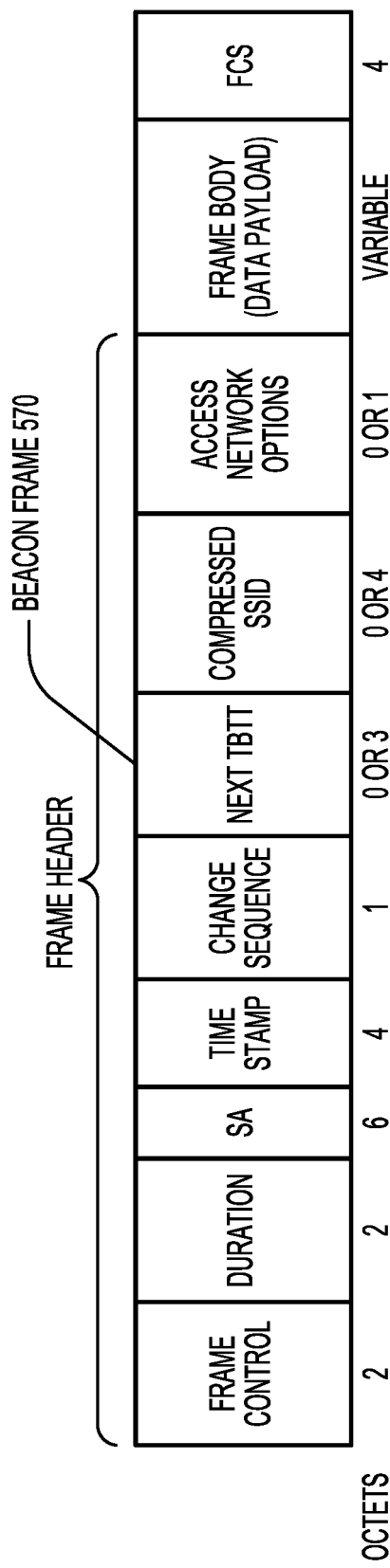
FIG. 5 illustrates an example of a beacon frame.

FIG. 5 illustrates an example of a beacon frame 570, according to some embodiments of the present invention. Beacon frame 570 includes a frame header, a frame body, and a frame check sequence (FCS). The frame header is partitioned into various fields as illustrated in FIG. 5. The frame control field defines a frame type and is 2 octets in size. The duration field is set to the duration of time (in microseconds) required by the paged stations (STAs) to transmit any pending quality of service (QoS) Null, PS-Poll or null data packet (NDP) PS-Poll frames and is 2 octets in size. The SA field is the address of the STA that is transmitting beacon frame 570 and is 6 octets in size. The time stamp field contains the 4 least significant octets of the transmitting STA's timing synchronization function (TSF) timer at the time that the start of the data symbol containing the first bit of the time stamp is transmitted by the physical layer (PHY) plus the transmitting STA's delays through its local PHY from the MAC-PHY interface to its interface with the wireless medium (WM).

The change sequence field is defined as an unsigned integer, initialized to 0, that increments when a critical update to the beacon frame has occurred. The next target beacon transmission time (TBTT) field is present if the next TBTT present field in the frame control field is 1 and indicates the most significant 3 octets of the 4 least significant octets of the next TBTT. Otherwise, it is not present. The compressed service set identifier (SSID) field is present if the compressed SSID present field in the frame control is 1 and indicates a 32-bit cyclic redundancy check (CRC) calculated over the SSID contained in beacon frame 570. Otherwise, it is not present. The access network options field is present if the ANO field in the frame control field is 1.

The frame body contains one or more elements and is variable in length. In some embodiments, a single element may be formed to include all of the correction data to be transmitted in beacon frame 570. In some embodiments, the correction data may be separated into multiple elements, such as N elements. For example, a first element may include a first phase calculated based on a first GNSS signal received by the base station and a second element may include a second phase calculated based on a second GNSS signal received by the base station.

The FCS may include an error-detecting code used to detect and/or correct one or more errors in the data when beacon frame 570 is received by the rover. In some embodiments, the FCS may employ a CRC in which a check value is calculated based on the remainder of a polynomial division of the data. When beacon frame 570 is received by the rover, the rover may repeat the calculation and perform a corrective action in the event that the values calculated by the rover do not match the check values. In the illustrated embodiment, the FCS is 4 octets in size.

Figure 6:
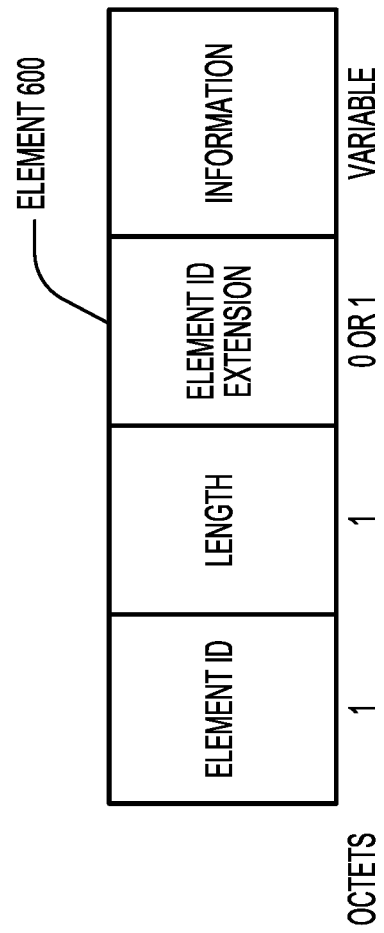
FIG. 6 illustrates an example of an element.

FIG. 6 illustrates an example of an element 600, according to some embodiments of the present invention. Element 600 may be defined to have a format consisting of a 1 octet element ID field, a 1 octet length field, an optional 1 octet element ID extension field, and a variable-length element-specific instruction field. Element 600 may be identified by the contents of the element ID and, when present, element ID extension fields. An extended element ID is a combination of an element ID and an element ID extension for those elements that have a defined element ID extension. The length field specifies the number of octets following the length field. The presence of the element ID extension field is determined by the element ID field.

Figure 7:
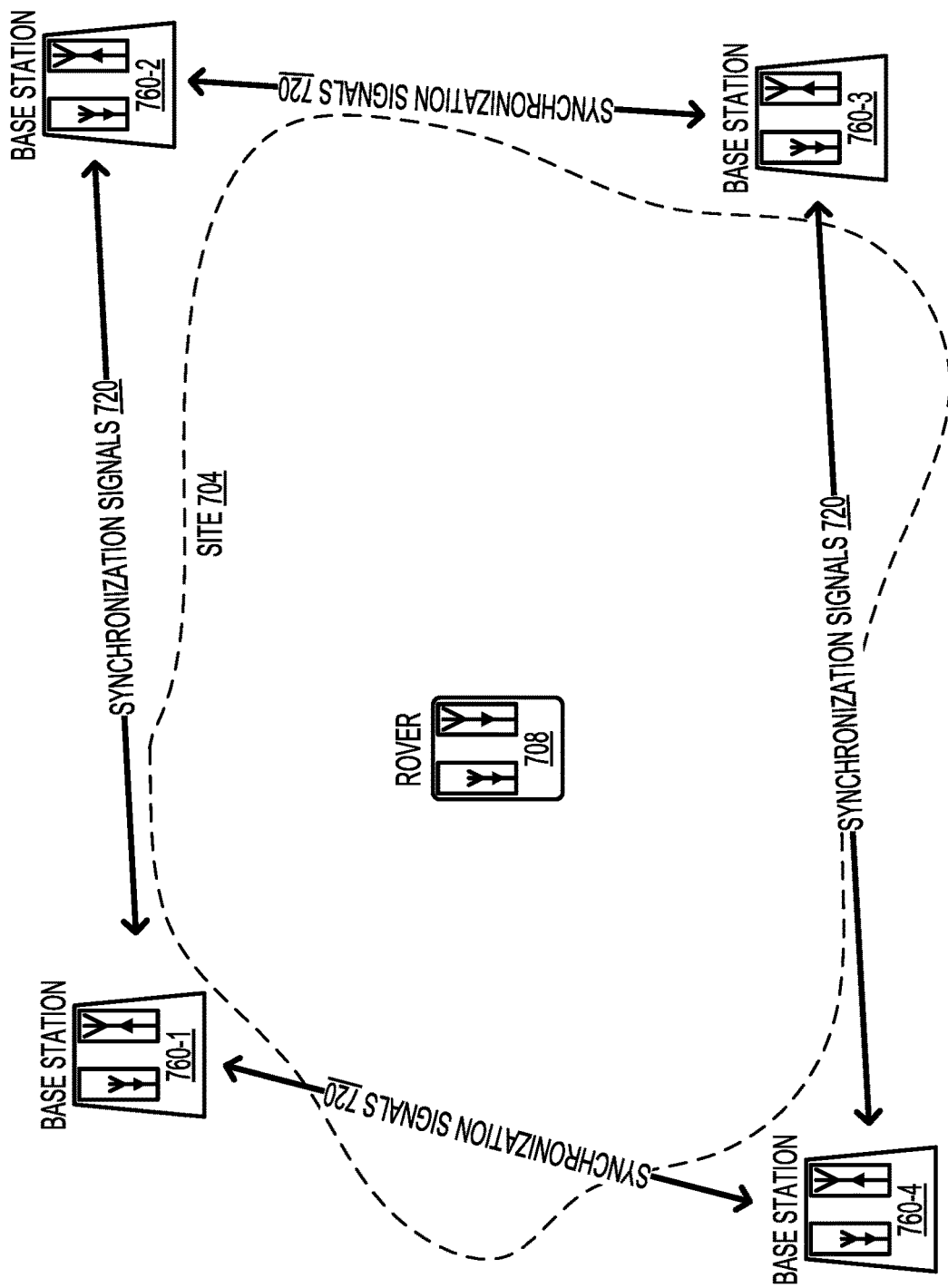
FIG. 7 illustrates an example operation of a rover and multiple base stations at a site.

FIG. 7 illustrates an example operation of a rover 708 and multiple base stations 760 at a site 704, according to some embodiments of the present invention. Site 704 may be any location where correction data may be received by rover 708 from base stations 760. In one example, site 704 may be a construction site and rover 708 may be attached to a construction vehicle. Base stations 760 may be mobile or stationary. For example, in some embodiments base stations 760 may be brought to site 704 and may be placed within or surrounding site 704. Base stations 760 may transmit one or more synchronization signals 720 amongst each other to synchronize local clocks and/or to coordinate transmission of correction signals containing beacon frames.

Figure 8:
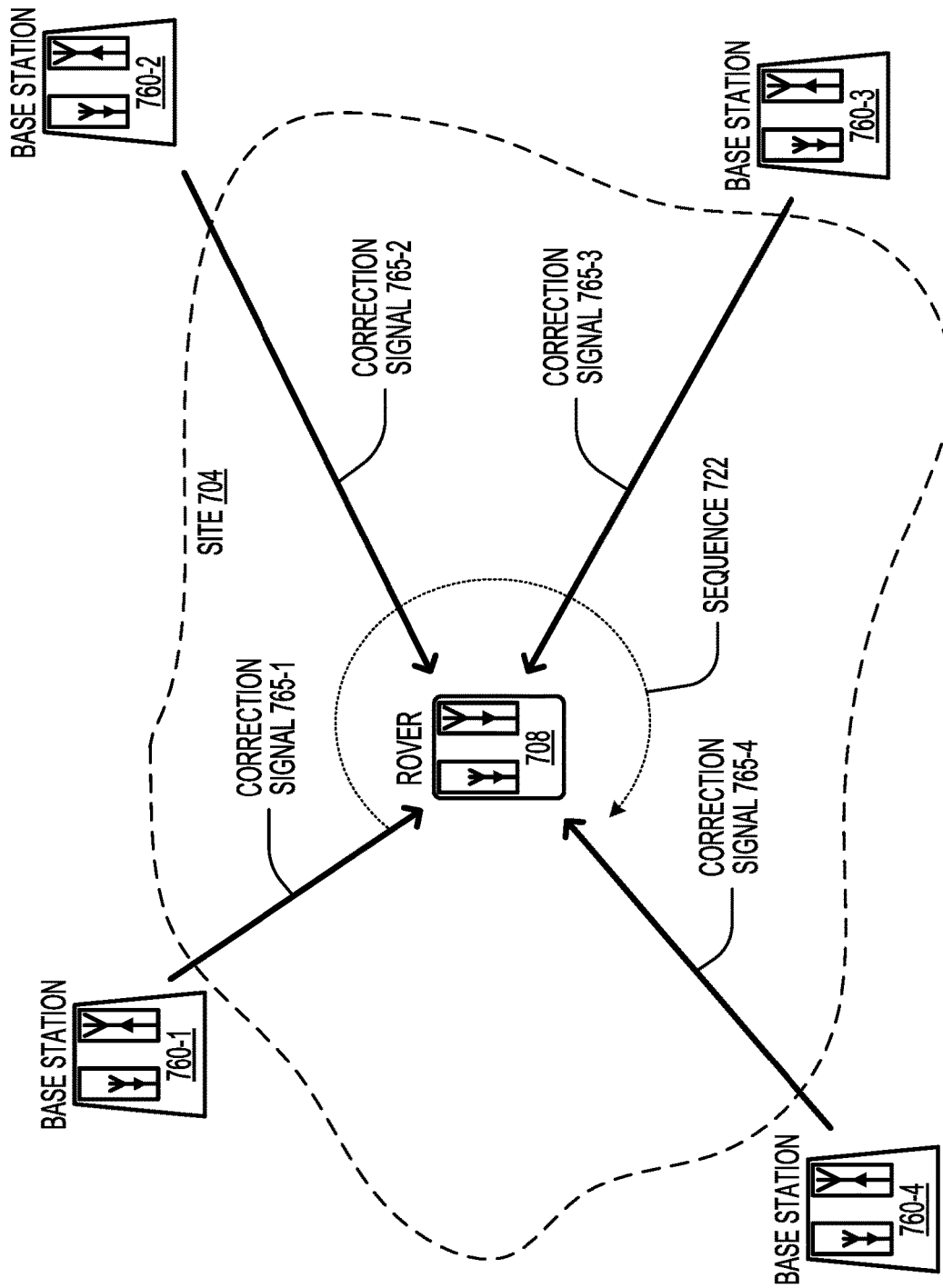
FIG. 8 illustrates an example operation of a rover and multiple base stations at a site.

FIG. 8 illustrates an example operation of rover 708 and base stations 760 at site 704, according to some embodiments of the present invention. Once synchronized, base stations 760 may transmit correction signals 765 containing beacon frames in accordance with a sequence 722. Sequence 722 may include an order in which correction signals 765 are transmitted as well as a spacing between successive transmitted correction signals 765. For example, base station 760-1 may transmit correction signal 765-1 at a first time $T_1$, base station 760-2 may transmit correction signal 765-2 at a second time $T_2$, base station 760-3 may transmit correction signal 765-3 at a third time $T_3$, and base station 760-4 may transmit correction signal 765-4 at a fourth time $T_4$. Sequence 722 may specify that $T_2$ is after $T_1$, $T_3$ is after $T_2$, and $T_4$ is after $T_3$. Additionally, sequence 722 may specify that correction signals 765 are evenly spaced, i.e., $T_2-T_1=T_3-T_2=T_4-T_3$.

Figure 9:
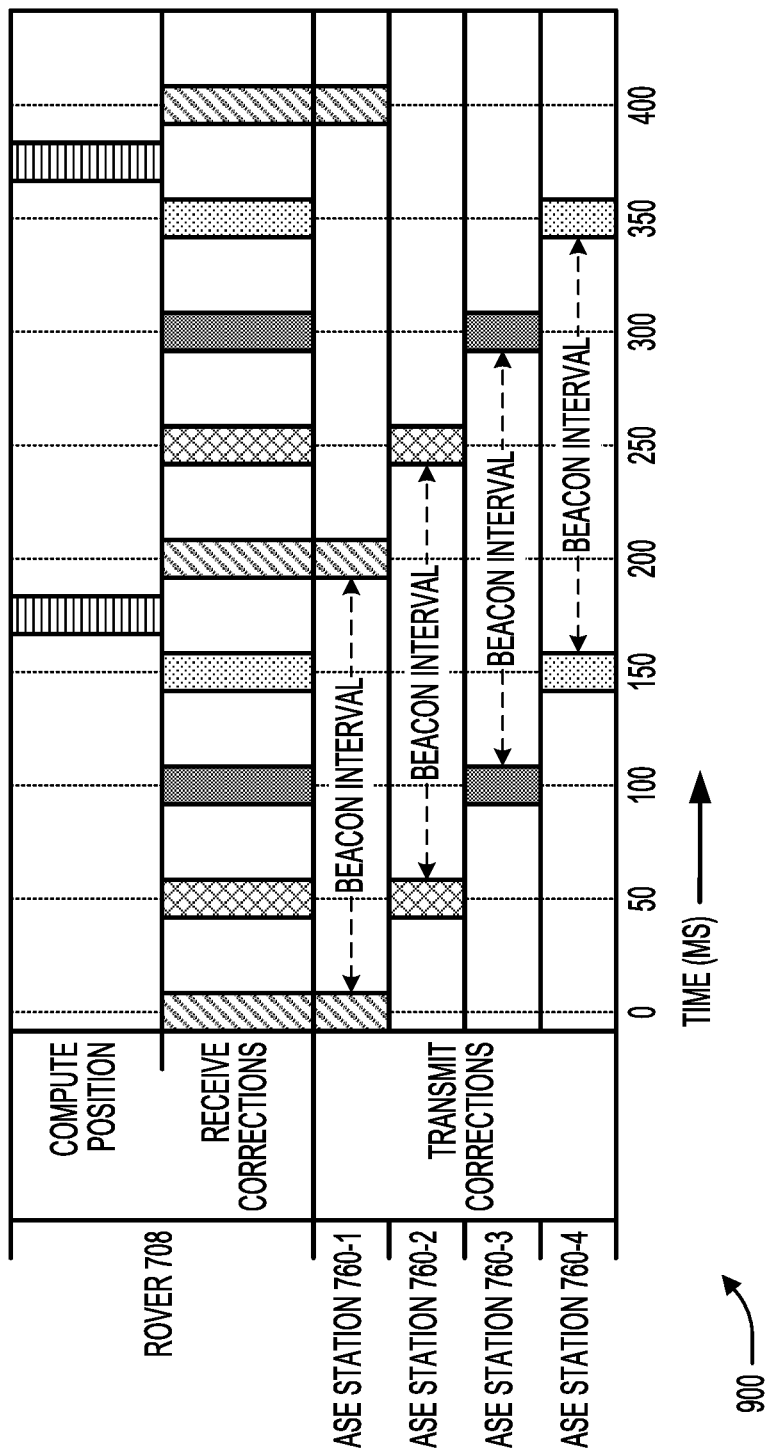
FIG. 9 illustrates an example of a timing chart showing the transmission of correction signals by base stations.

FIG. 9 illustrates an example of a timing chart 900 showing the transmission of correction signals by synchronized base stations 760, according to some embodiments of the present invention. At 0 ms, base station 760-1 transmits a correction signal, which is received by rover 708. Thereafter at 50 ms, 100 ms, and 150 ms, base stations 760-2, 760-3, and 760-4 transmit correction signals, respectively, which are received by rover 708. Due to the 50 ms spacing between successive correction signals, rover 708 is able to properly receive and process each correction signal. At 175 ms, after receiving the correction signal transmitted by base station 760-4, rover 708 computes its geospatial position based on the received GNSS signals and correction signals.

The beacon interval is the time between successive transmissions of correction signals by a single base station. During synchronization, base stations 760 may communicate a common beacon interval with each other and may coordinate transmission of the correction signals such that successive transmission times are offset by a fraction of the beacon interval (e.g., ¼ of the beacon interval for 4 base stations). In the embodiment shown in FIG. 9, the beacon interval is 200 ms. Accordingly, at 200 ms, 250 ms, 300 ms, and 350 ms, base stations 760-1, 760-2, 760-3, and 760-4 each transmit a second correction signal, respectively. The second correction signals may include updated correction data that is different from the correction data contained in the first correction signals. For example, between transmission of the first correction signals and the second correction signals, each of base stations 760 may receive new GNSS signals and may generate updated correction data based on the new GNSS signals. In some embodiments, the second correction signals could be copies of the first corrections signals to improve reliability of reception.

Figure 10:
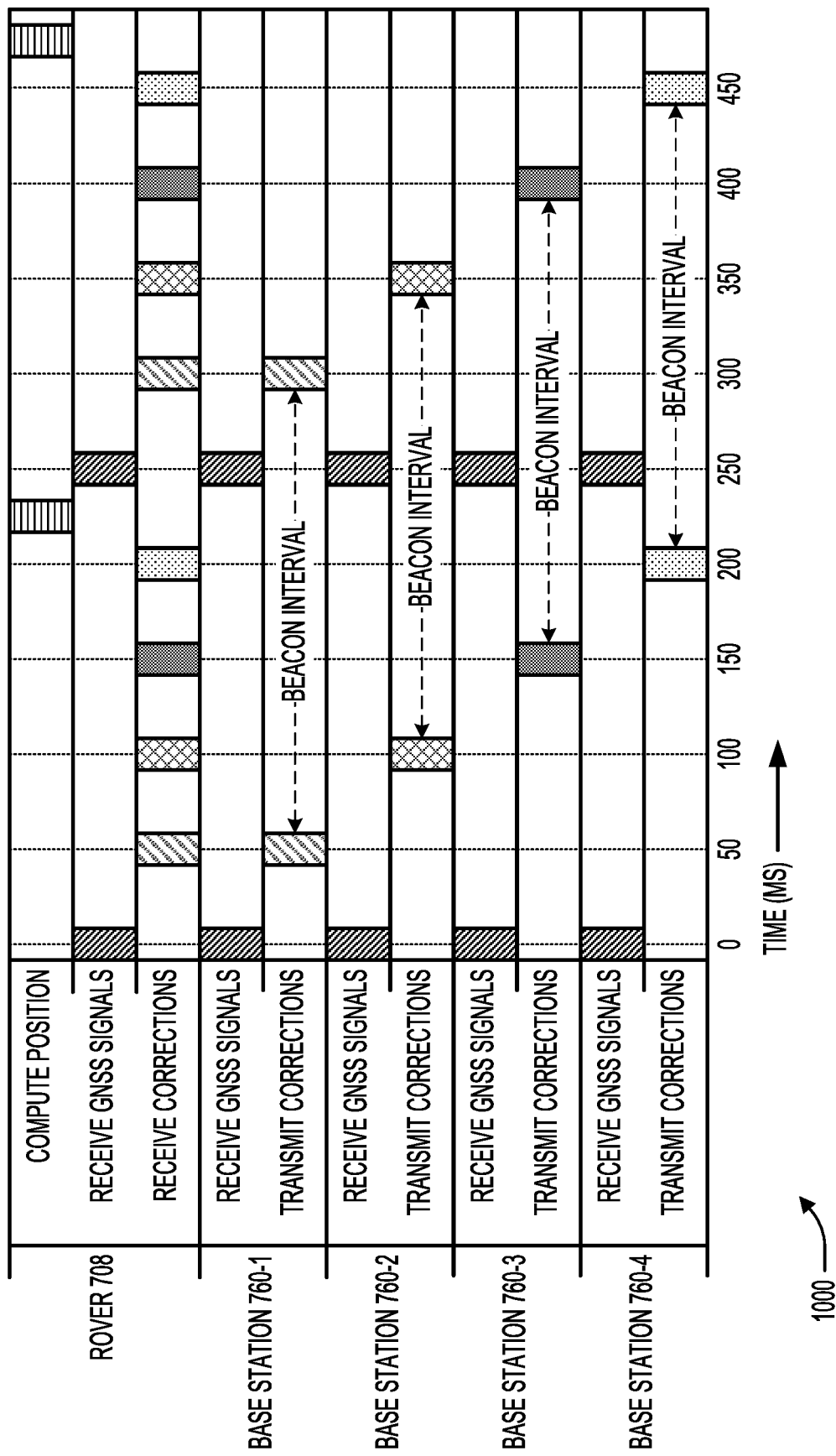
FIG. 10 illustrates an example of a timing chart showing the transmission of correction signals by base stations.

FIG. 10 illustrates an example of a timing chart 1000 showing the transmission of correction signals by synchronized base stations 760, according to some embodiments of the present invention. At 0 ms, base stations 760 and rover 708 each receive GNSS signals from N GNSS satellites. At 50 ms, base station 760-1 transmits a correction signal, which is received by rover 708. Thereafter at 100 ms, 150 ms, and 200 ms, base stations 760-2, 760-3, and 760-4 transmit correction signals, respectively, which are received by rover 708. At 225 ms, after receiving the correction signal transmitted by base station 760-4, rover 708 computes its geospatial position based on the received GNSS signals and correction signals.

In the embodiment shown in FIG. 10, the beacon interval is 250 ms and transmission of the correction signals are coordinated such that successive transmission times are offset by a ⅕ of the beacon interval. Base stations 760 and rover 708 are synchronized such that GNSS are received simultaneously at 0 ms, 250 ms, and so on. This ensures that the correction data received by rover 708 corresponds to the GNSS signals received by rover 708. Accordingly, when rover 708 computes its geospatial position at 225 ms, the computed position may correspond to its position 225 ms prior to that time.

In some embodiments, rover 708 may gradually apply correction data to its computed position as additional correction data is received from base stations 760. For example, rover 708 may compute its geospatial position at 25 ms using only GNSS signals received by rover 708, again at 75 ms additionally using correction data received from base station 760-1, again at 125 ms additionally using correction data received from base station 760-2, again at 175 ms additionally using correction data received from base station 760-3, and again at 225 ms additionally using correction data received from base station 760-4.

It should be understood that timing charts 900 and 1000 are examples only, and that the beacon rates, beacon times, and/or offsets may vary from the illustrated embodiments. For example, in some implementations, the beacon rate may vary from 100 ms to 5 s (e.g., 100 ms, 200 ms, 300 ms, 400 ms, 500 ms, 600 ms, 700 ms, 800 ms, 900 ms, 1 s, 2 s, 3 s, 4 s, or 5 s). In the same implementations, the offset between successive transmissions of correction signals may vary from 50 ms to 5 s (e.g., 50 ms, 100 ms, 150 ms, 200 ms, 300 ms, 400 ms, 500 ms, 600 ms, 700 ms, 800 ms, 900 ms, 1 s, 2 s, 3 s, 4 s, or 5 s). Other possibilities are contemplated.

Figure 11:
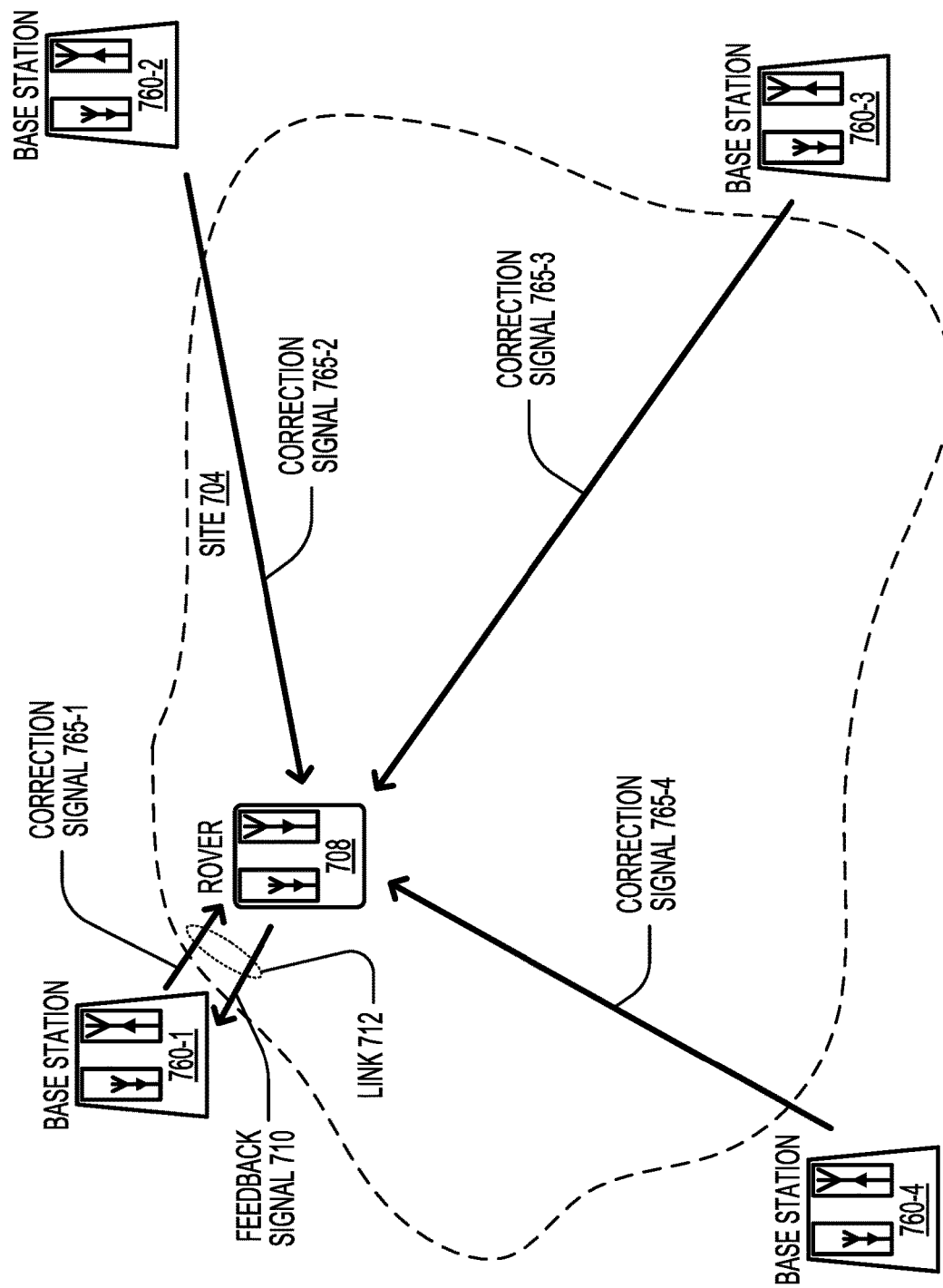
FIG. 11 illustrates an example operation of a rover and multiple base stations at a site.

FIG. 11 illustrates an example operation of rover 708 and base stations 760 at site 704, according to some embodiments of the present invention. In some embodiments, rover 708 may determine based on correction signals 765 whether it is close enough to any of base stations 760 to form a communication link 712 that enables two way communications. For example, rover 708 may determine that it is close enough to base station 760-1 and may form link 712 with base station 760-1. In some embodiments, link 712 may include an "authenticated" connection that requires, for example, a password or certain credentials.

Through link 712, rover 708 may transmit a feedback signal 710 that may include various data for site operations, such as video data, image data, and feedback for the base station. In various examples, the feedback may include request for a higher or lower beacon rate, a higher or lower beacon interval, a higher or lower signal strength, among other possibilities. In some embodiments, feedback signal 710 may indicate that rover 708 is no longer receiving correction signals 765 or that rover 708 is starting to receive correction signals 765. In some embodiments, rover 708 may identify the number of GNSS satellites that it is currently receiving GNSS signals from, and may calculate a beacon interval based on the number of GNSS satellites. For example, to give rover 708 sufficient processing time for processing received GNSS signals for N GNSS satellites as well as the correction data for N GNSS satellites, rover 708 may request for a longer beacon rate when N is large and a shorter beacon rate when N is small.

When rover 708 moves away from base station 760-1, it may terminate link 712 and look for a different base station to associate with. For example, rover 708 may subsequently determine that is close enough to base station 760-2 and may form a link with base station 760-2. Between the times that rover 708 is connected to base station 760-1 and base station 760-2, rover 708 may store data on a memory device that is to be communicated via a feedback signal upon again connecting with a base station.

Figure 12:
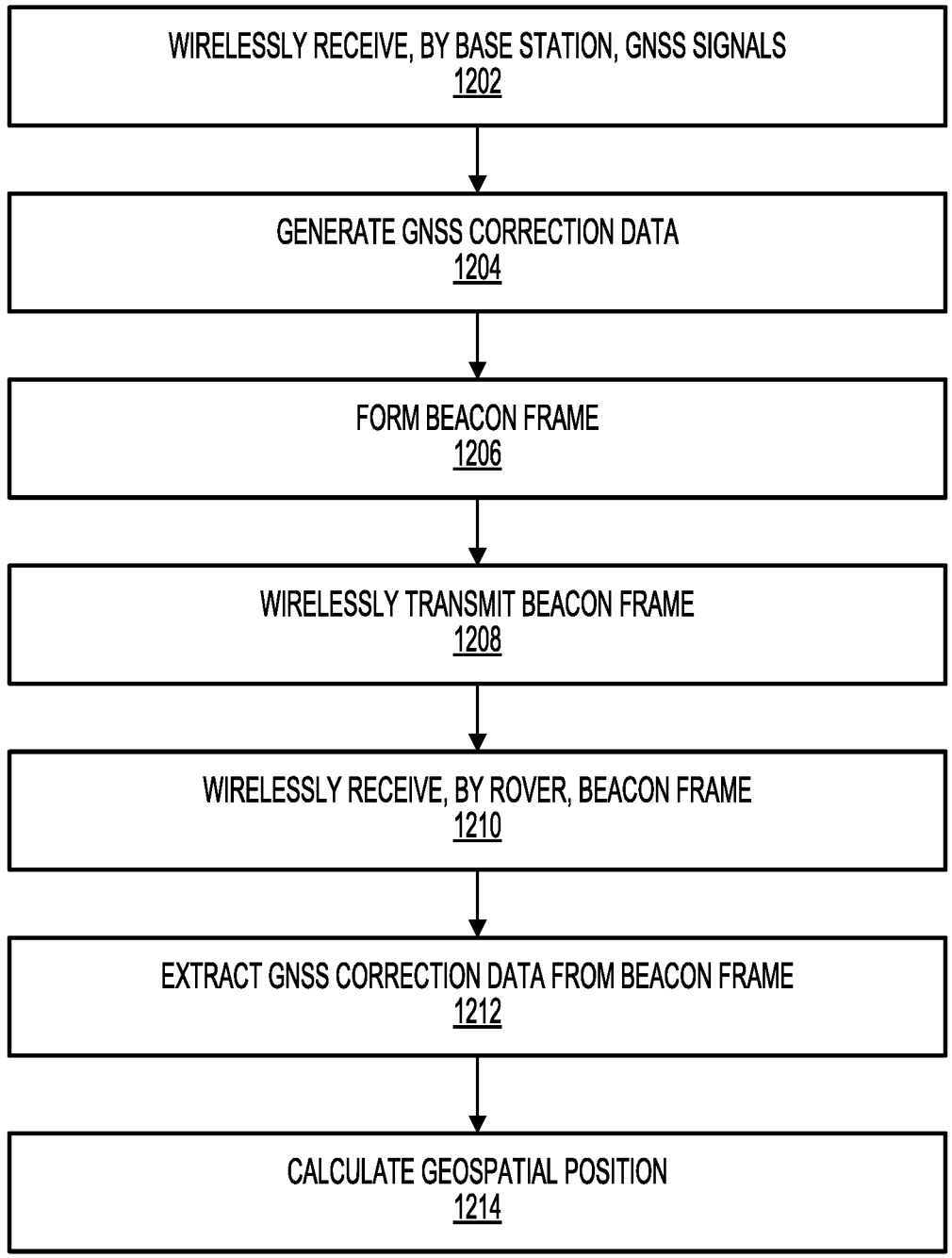
FIG. 12 illustrates a method of transmitting GNSS correction data to a rover.

FIG. 12 illustrates a method 1200 of transmitting GNSS correction data to a rover, according to some embodiments of the present invention. One or more steps of method 1200 may be performed in a different order than shown in FIG. 12, and one or more steps of method 1200 may be omitted during performance of method 1200. One or more steps of method 1200 may be implemented in hardware or software.

At step 1202, GNSS signals (e.g., wireless signals 104) are wirelessly received from one or more GNSS satellites (e.g., GNSS satellites 102 or 302). In some embodiments, the GNSS signals are received by a base station (e.g., base stations 160, 460, or 760). In some embodiments, the GNSS signals are received via a GNSS antenna (e.g., GNSS antennas 162 or 462).

At step 1204, GNSS correction data (e.g., GNSS correction data 472) is generated based on the GNSS signals. In some embodiments, the GNSS correction data is generated by the base station. In some embodiments, the correction data includes a plurality of phases corresponding to the GNSS signals. For example, the base station may calculate the plurality of phases based on the GNSS signals.

At step 1206, a beacon frame (e.g., beacon frame 470) is formed using the GNSS correction data. In some embodiments, the beacon frame is formed to include a frame header, a frame body, and an FCS. In some embodiments, the frame body is formed to include the GNSS correction data. For example, the GNSS correction data may be inserted into the frame body. In some embodiments, the beacon frame is a Wi-Fi beacon frame. In some embodiments, step 1206 includes forming an element comprising an element ID, a length, and information containing the GNSS correction data. In some embodiments, the FCS includes error-detecting code.

At step 1208, the beacon frame is wirelessly transmitted. In some embodiments, the beacon frame is transmitted by the base station. In some embodiments, the beacon frame is transmitted for receipt by the rover. In some embodiments, a correction signal (e.g., correction signals 165, 465, or 765) is wirelessly transmitted that contains the beacon frame. In some embodiments, the beacon frame is transmitted via a correction antenna (e.g., correction antennas 164 or 464).

At step 1210, the beacon frame is wirelessly received. In some embodiments, the beacon frame is wirelessly received by the rover. In some embodiments, the correction signal containing the beacon frame is wirelessly received by the rover. In some embodiments, the beacon frame is received via a correction antenna (e.g., correction antenna 118).

At step 1212, the GNSS correction data is extracted from the beacon frame. In some embodiments, the GNSS correction data is extracted from the beacon frame by the rover.

At step 1214, a geospatial position of the rover is calculated based on the GNSS correction data. In some embodiments, the geospatial position of the rover is calculated by the rover.

Figure 13:
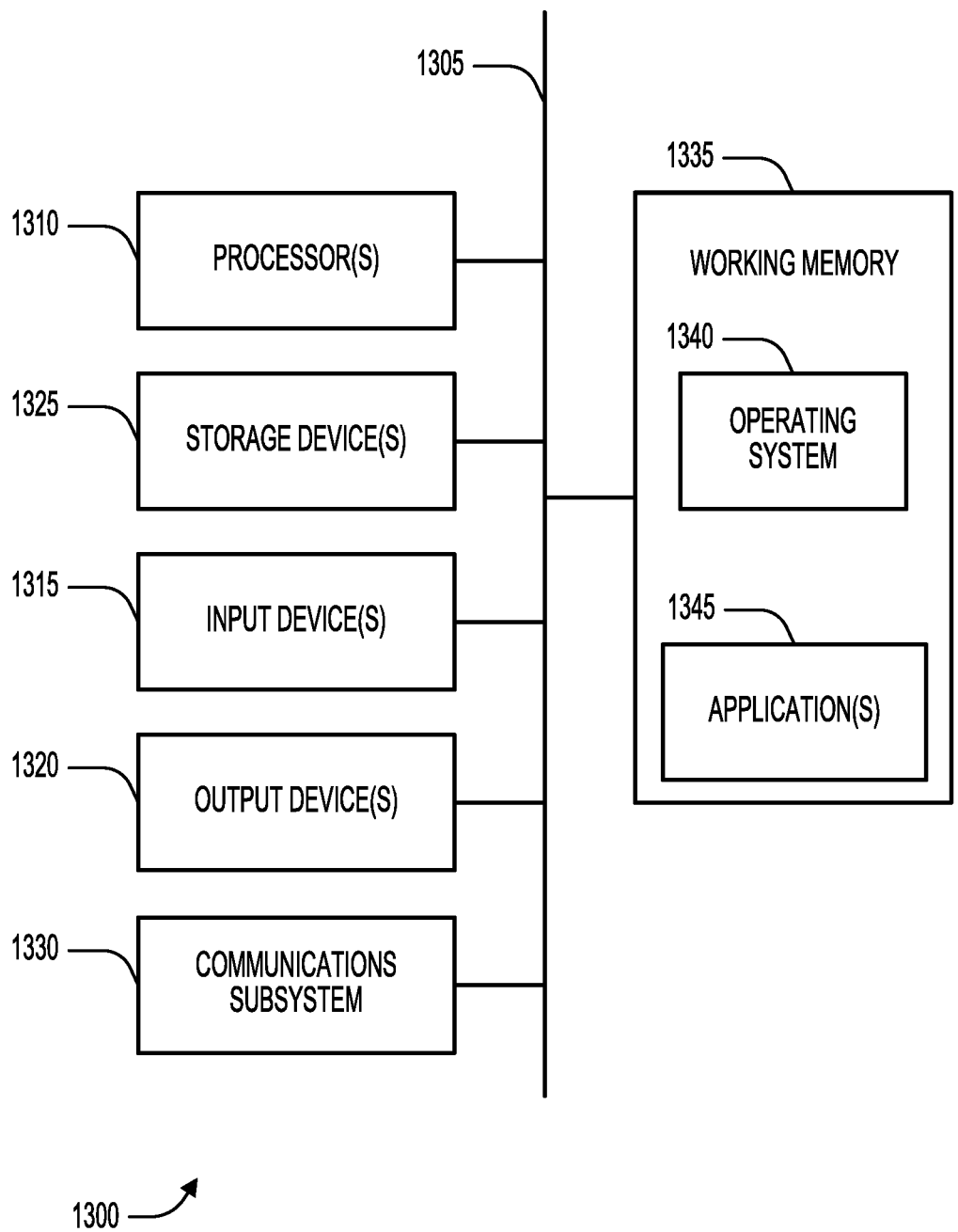
FIG. 13 illustrates a simplified computer system.

FIG. 13 illustrates a simplified computer system 1300, according to some embodiments of the present invention. FIG. 13 provides a schematic illustration of one embodiment of computer system 1300 that can perform some or all of the steps of the methods provided by various embodiments. It should be noted that FIG. 13 is meant only to provide a generalized illustration of various components, any or all of which may be utilized as appropriate. FIG. 13, therefore, broadly illustrates how individual system elements may be implemented in a relatively separated or more integrated manner.

Computer system 1300 is shown comprising hardware elements that can be electrically coupled via a bus 1305, or may otherwise be in communication, as appropriate. The hardware elements may include one or more processors 1310, including without limitation one or more general-purpose processors and/or one or more special-purpose processors such as digital signal processing chips, graphics acceleration processors, and/or the like; one or more input devices 1315, which can include, without limitation a mouse, a keyboard, a camera, and/or the like; and one or more output devices 1320, which can include, without limitation a display device, a printer, and/or the like.

Computer system 1300 may further include and/or be in communication with one or more non-transitory storage devices 1325, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 1300 might also include a communications subsystem 1330, which can include, without limitation a modem, a network card (wireless or wired), an infrared communication device, a wireless communication device, and/or a chipset such as a Bluetooth® device, an 802.11 device, a Wi-Fi device, a WiMax device, cellular communication facilities, etc., and/or the like. The communications subsystem 1330 may include one or more input and/or output communication interfaces to permit data to be exchanged with a network such as the network described below to name one example, to other computer systems, and/or any other devices described herein. Depending on the desired functionality and/or other implementation concerns, a portable electronic device or similar device may communicate image and/or other information via the communications subsystem 1330. In other embodiments, a portable electronic device, e.g. the first electronic device, may be incorporated into computer system 1300, e.g., an electronic device as an input device 1315. In some embodiments, computer system 1300 will further comprise a working memory 1335, which can include a RAM or ROM device, as described above.

Computer system 1300 also can include software elements, shown as being currently located within the working memory 1335, including an operating system 1340, device drivers, executable libraries, and/or other code, such as one or more application programs 1345, which may comprise computer programs provided by various embodiments, and/or may be designed to implement methods, and/or configure systems, provided by other embodiments, as described herein. Merely by way of example, one or more procedures described with respect to the methods discussed above can be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1325 described above. In some cases, the storage medium might be incorporated within a computer system, such as computer system 1300. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 1300 and/or might take the form of source and/or installable code, which, upon compilation and/or installation on computer system 1300 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware or software including portable software, such as applets, etc., or both. Further, connection to other computing devices such as network input/output devices may be employed.

As mentioned above, in one aspect, some embodiments may employ a computer system such as computer system 1300 to perform methods in accordance with various embodiments of the technology. According to a set of embodiments, some or all of the procedures of such methods are performed by computer system 1300 in response to processor 1310 executing one or more sequences of one or more instructions, which might be incorporated into the operating system 1340 and/or other code, such as an application program 1345, contained in the working memory 1335. Such instructions may be read into the working memory 1335 from another computer-readable medium, such as one or more of the storage device(s) 1325. Merely by way of example, execution of the sequences of instructions contained in the working memory 1335 might cause the processor(s) 1310 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using computer system 1300, various computer-readable media might be involved in providing instructions/code to processor(s) 1310 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1325. Volatile media include, without limitation, dynamic memory, such as the working memory 1335.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 1300.

The communications subsystem 1330 and/or components thereof generally will receive signals, and the bus 1305 then might carry the signals and/or the data, instructions, etc. carried by the signals to the working memory 1335, from which the processor(s) 1310 retrieves and executes the instructions. The instructions received by the working memory 1335 may optionally be stored on a non-transitory storage device 1325 either before or after execution by the processor(s) 1310.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method of transmitting global navigation satellite system (GNSS) correction data to a rover, the method comprising:
   wirelessly receiving, by a base station, GNSS signals from one or more GNSS satellites;
   generating, by the base station, the GNSS correction data based on the GNSS signals;
   forming, by the base station, a beacon frame to contain the GNSS correction data, wherein the beacon frame is associated with a wireless-local-area network (WLAN) and comprises a frame header, a frame body, and a frame check sequence (FCS), and wherein the frame body is formed to include the GNSS correction data;
   wirelessly transmitting, by the base station, the beacon frame, wherein transmitting the beacon frame announces the presence of the WLAN, provides information allowing devices to connect with the WLAN, and provides access to the GNSS correction data;
   wirelessly receiving, by the rover, the beacon frame;
   extracting, by the rover, the GNSS correction data from the beacon frame; and
   calculating, by the rover, a geospatial position of the rover based on the GNSS correction data, such that the GNSS correction data wirelessly transmitted in the beacon frame is used in the calculation for the geospatial position of the rover.

2. The method of claim 1, wherein the beacon frame is a Wi-Fi beacon frame.

3. The method of claim 1, wherein forming the beacon frame includes:
   calculating the FCS based on the frame header and the frame body; and
   appending the FCS to the frame header and the frame body.

4. The method of claim 1, wherein forming the beacon frame includes:
   forming an element comprising an element ID, a length, and information containing the GNSS correction data.

5. The method of claim 1, wherein the correction data includes a plurality of phases corresponding to the GNSS signals.

6. The method of claim 1, wherein the FCS includes a cyclic redundancy check (CRC) error-detecting code.

7. The method of claim 1, wherein the base station includes a GNSS antenna and a correction antenna, wherein the GNSS signals are received via the GNSS antenna and the beacon frame is transmitted via the correction antenna.

8. The method of claim 1, further comprising:
   at each of a plurality of times separated by a beacon interval:
   wirelessly receiving, by the base station, new GNSS signals from one or more new GNSS satellites;
   generating, by the base station, new GNSS correction data based on the new GNSS signals;
   forming, by the base station, a new beacon frame comprising a new frame body includes the new GNSS correction data; and
   wirelessly transmitting, by the base station, the new beacon frame for receipt by the rover.

9. A base station comprising:
   a global navigation satellite system (GNSS) antenna;
   a correction antenna; and
   one or more processors communicatively coupled to the GNSS antenna and the correction antenna, wherein the one or more processors are configured to perform operations comprising:
   wirelessly receiving, via the GNSS antenna, GNSS signals from one or more GNSS satellites;

generating GNSS correction data based on the GNSS signals;

forming a beacon frame to contain the GNSS correction data, wherein the beacon frame is associated with a wireless-local-area network (WLAN) and comprises a frame header, a frame body, and a frame check sequence (FCS), and wherein the frame body is formed to include the GNSS correction data; and wirelessly transmitting, via the correction antenna, the beacon frame for receipt by a rover, wherein transmitting the beacon frame announces the presence of the WLAN, provides information allowing devices to connect with the WLAN, and provides access to the GNSS correction data, and wherein the rover is operable to wirelessly receive the beacon frame and calculate a geospatial position of the rover based on the GNSS correction data, such that the GNSS correction data wirelessly transmitted in the beacon frame is used in the calculation for the geospatial position of the rover.

10. The base station of claim 8, wherein the beacon frame is a Wi-Fi beacon frame.

11. The base station of claim 8, wherein forming the beacon frame includes:
   calculating the FCS based on the frame header and the frame body; and
   appending the FCS to the frame header and the frame body.

12. The base station of claim 8, wherein forming the beacon frame includes:
   forming an element comprising an element ID, a length, and information containing the GNSS correction data.

13. The base station of claim 8, wherein the correction data includes a plurality of phases corresponding to the GNSS signals.

14. The base station of claim 8, wherein the FCS includes a cyclic redundancy check (CRC) error-detecting code.

15. The base station of claim 8, wherein the operations further comprise:
   at each of a plurality of times separated by a beacon interval:
      wirelessly receiving, by the base station, new GNSS signals from one or more new GNSS satellites;
      generating, by the base station, new GNSS correction data based on the new GNSS signals;
      forming, by the base station, a new beacon frame comprising a new frame body includes the new GNSS correction data; and
      wirelessly transmitting, by the base station, the new beacon frame for receipt by the rover.

16. A non-transitory computer-readable medium comprising instructions that, when executed by one or more processors, cause the one or more processors to perform operations comprising:
   wirelessly receiving, by a base station, global navigation satellite system (GNSS) signals from one or more GNSS satellites;
   generating, by the base station, GNSS correction data based on the GNSS signals;
   forming, by the base station, a beacon frame to contain the GNSS correction data, wherein the beacon frame is associated with a wireless-local-area network (WLAN) and comprises a frame header, a frame body, and a frame check sequence (FCS), and wherein the frame body is formed to include the GNSS correction data;
   wirelessly transmitting, by the base station, the beacon frame for receipt by a rover, wherein transmitting the beacon frame announces the presence of the WLAN, provides information allowing devices to connect with the WLAN, and provides access to the GNSS correction data, and wherein the rover is operable to wirelessly receive the beacon frame and calculate a geospatial position of the rover based on the GNSS correction data, such that the GNSS correction data wirelessly transmitted in the beacon frame is used in the calculation for the geospatial position of the rover.

17. The non-transitory computer-readable medium of claim 16, wherein the beacon frame is a Wi-Fi beacon frame.

18. The non-transitory computer-readable medium of claim 16, wherein forming the beacon frame includes:
   forming an element comprising an element ID, a length, and information containing the GNSS correction data.

19. The non-transitory computer-readable medium of claim 16, wherein the correction data includes a plurality of phases corresponding to the GNSS signals.

20. The non-transitory computer-readable medium of claim 16, wherein the operations further comprise:
   at each of a plurality of times separated by a beacon interval:
      wirelessly receiving, by the base station, new GNSS signals from one or more new GNSS satellites;
      generating, by the base station, new GNSS correction data based on the new GNSS signals;
      forming, by the base station, a new beacon frame comprising a new frame body includes the new GNSS correction data; and
      wirelessly transmitting, by the base station, the new beacon frame for receipt by the rover.

* * * * *